(12) United States Patent
Naert et al.

(10) Patent No.: US 8,653,172 B2
(45) Date of Patent: Feb. 18, 2014

(54) PLASTICISER BLENDS AND COMPOSITIONS AND ARTICLES MADE THEREFROM

(75) Inventors: Didier Naert, Brussels (BE); Allen D. Godwin, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/579,672

(22) PCT Filed: Mar. 3, 2011

(86) PCT No.: PCT/EP2011/053234
§ 371 (c)(1),
(2), (4) Date: Oct. 18, 2012

(87) PCT Pub. No.: WO2011/113707
PCT Pub. Date: Sep. 22, 2011

(65) Prior Publication Data
US 2013/0062094 A1 Mar. 14, 2013

Related U.S. Application Data

(60) Provisional application No. 61/314,821, filed on Mar. 17, 2010.

(51) Int. Cl.
*C08K 5/11* (2006.01)
*C08K 5/12* (2006.01)
(52) U.S. Cl.
USPC .......................... 524/295; 524/314; 524/569
(58) Field of Classification Search
USPC .......................................... 524/295, 314, 569
See application file for complete search history.

(56) References Cited

U.S. PATENT DOCUMENTS

| 5,460,885 | A | 10/1995 | Chu-Ba |
| 5,756,430 | A | 5/1998 | Zielinski |
| 5,880,075 | A | 3/1999 | Hartley et al. |
| 6,969,735 | B1 | 11/2005 | Godwin |
| 7,300,966 | B2 | 11/2007 | Breitscheidel et al. |
| 2007/0037926 | A1* | 2/2007 | Olsen et al. .................... 524/569 |
| 2009/0054574 | A1 | 2/2009 | Holt et al. |
| 2009/0062454 | A1* | 3/2009 | Hardouin-Duparc et al. .............................. 524/569 |

FOREIGN PATENT DOCUMENTS

JP 61133509 6/1986

OTHER PUBLICATIONS

Dimier W. A. Jr. et al,; "The Use of Ditridecyl Phthalate (DTDP) In Polyvinyl Chloride Resin Formulations", Society of Plastics Engineers, Annual Technical Conferences, The Society, Brookfield Center, CT, US, vol. 6 (Jan. 1, 1960), pp. 57-1-57-5.

A.D. Godwin: "Plasticisers", Applied Polymer Science $21^{st}$ Century, Edited by C.D. Craver and C.E. Carraher, Elsevier (2000); pp. 157-175.

* cited by examiner

*Primary Examiner* — Peter Szekely
(74) *Attorney, Agent, or Firm* — Leandro Arechederra, III

(57) ABSTRACT

Plasticizer blends of $C_{10}$ to $C_{14}$ dialkyl phthalates or $C_8$ to $C_{10}$ trimellitates and $C_{11}$ to $C_{14}$ dialkyl adipates are provided. The blends may be used in the manufacture of flexible PVC formulations, for example, as wire and cable coatings, having in several embodiments, good performance over a wide temperature range and are particularly useful for automotive cables.

1 Claim, No Drawings

PLASTICISER BLENDS AND COMPOSITIONS AND ARTICLES MADE THEREFROM

CROSS REFERENCE TO RELATED APPLICATIONS

This patent application is a National Stage Application of International Application No. PCT/EP2011/053234 filed Mar. 3, 2011, which claims the benefit of Ser. No. 61/314,821, filed Mar. 17, 2010, the disclosure of which is incorporated by reference in its entirety.

FIELD OF THE INVENTION

The present invention relates to improvements in or relating to plasticisers. In particular, the invention relates to plasticisers useful for plasticising polyvinyl chloride (PVC) and more particularly, the invention provides plasticisers that, when used with PVC, provide compositions with improved low temperature properties which are especially useful for wire and cable coating and in particular for the provision of jacketing and insulation for automotive wire and cables.

BACKGROUND

Plasticisers are incorporated into a resin (usually a plastic or elastomer) to increase the flexibility, workability, or distensibility of the resin. The largest use of plasticisers is in the production of "plasticised" or flexible polyvinyl chloride (PVC) products. Typical uses of plasticised PVC include films, sheets, tubing, coated fabrics, wire and cable insulation and jacketing, flooring materials such as vinyl sheet flooring or vinyl floor tiles, adhesives, sealants, inks, and medical products such as blood bags and tubing, and the like.

Other polymer systems that use small amounts of plasticisers include polyvinyl butyral, acrylic polymers, poly (vinyldiene chloride), nylon, polyolefins, and certain fluoroplastics. Plasticisers can also be used with rubber (although often these materials fall under the definition of extenders for rubber rather than plasticisers). A listing of the major plasticisers and their compatibilities with different polymer systems is provided in "Plasticisers", A. D. Godwin, in Applied Polymer Science $21^{st}$ Century, edited by C. D. Craver and C. E. Carraher, Elsevier (2000); pp 157-175.

Plasticisers can be characterised on the basis of their chemical structure. The most important chemical class of plasticisers is phthalic acid esters. Two other important chemical classes are adipic acid esters and trimellitic acid esters. Di- and tri-esters of these aforementioned acids, having a molecular weight range from about 300 to 600, typically offer a balance of solvency and compatibility with the resin, yielding plasticised materials with useful properties and good aging abilities.

The performance specification for PVC formulations employed for wire and cable coating or jacketing depends upon the nature of the wire and cable and the use to which it is to be put. For example, European domestic wiring is subject to less rigorous conditions than wire and cable in automobiles which may be subject to a wide range of temperatures. Typically, wire and cables in automobiles are required to withstand temperatures as high as 150° C. due to the heat generated by the passage of electricity through the cable and as low as −40° C. to ensure the insulation is preserved if the automobile is subject to extreme weather conditions. Low temperature performance is also required for cables such as outdoor extension cables that are used in cold climates.

Important properties of a plasticiser for electrical insulation products include without limitation high plasticising efficiency, excellent compatibility with the resin, excellent processability, excellent oxidative stability, very low conductivity, and low volatility. Usually, when changes are made to improve one of these properties, some other important property is adversely affected. For example, an increase in the molecular weight of the alcohol used to produce the ester tends to reduce volatility at the expense of plasticising efficiency; the use of lower molecular weight alcohols will improve plasticising efficiency, but it can make the plasticizer too volatile for some applications. In addition, as the molecular weight of the ester plasticiser increases, its compatibility with PVC decreases, eventually resulting in a less desirable flexible PVC product with limited potential.

It is known to use di-tridecyl phthalates such as Jayflex™ DTDP for PVC wire and cable coating formulations to obtain the combination of low volatility and improved high temperature performance.

An important factor in the selection of the insulating material for wire and cable coating, and, in particular, automotive wire and cable coating, is the temperature to which the wire and cable is to be subjected (sometimes known as the service temperature). Cables are currently classified from $T_1$ to $T_6$ or Class A to Class D with service temperatures between −40° C. and 150° C. $T_1$ or Class A being the mildest classification and $T_6$ or Class D being amongst the most stringent. The low temperature performance is determined by cold strength tests, dynamic lending strength tests, or by wrapping (mandrel) tests according to ISO 6722. Linear phthalates such as di-linear-undecyl phthalate (Jayflex™ L11P or Palatinol® DUP) are known to improve low temperature properties compared with branched phthalates such as di-tridecyl phthalate (Jayflex™ DTDP). However, linear phthalates require linear alcohols which are scarce and expensive and accordingly the less expensive di-tridiceyl phthalates have been preferred. However, DTDP does not satisfy the more extreme low temperature requirements, particularly for cables of large cross sectional area. PVC wire and cable coating formulations are required to have good abrasion resistance to resist removal of the insulation. Abrasion resistance improves as the amount of plasticiser employed reduces; however, employing lower levels of plasticizers results in poorer low temperature flexibility.

The range of alcohols that are commercially useful in esterification for phthalate ester plasticiser manufacture is generally limited from about $C_4$ to about $C_{14}$ monohydric alcohols. It is known that the specific alcohols from which the esters are made influence the performance properties, e.g., the size and structure of the alkyl group helps determine the volatility and gellation temperature of the plasticisers. The type of alcohol used for esterification is therefore chosen according to the application in which the plasticised polyvinyl chloride is to be used. The alcohols from which the plasticiser esters are made are generally obtained by either olefin oligomerisation followed by hydroformylation or by hydroformylation of olefins to form aldehydes, followed by aldehyde dimerisation, generally through an aldol reaction. The alkyl groups of the esters therefore vary in size and structure according to the process used to produce the alcohols.

It is known to blend plasticisers to obtain a desired combination of properties. U.S. Pat. No. 6,969,735 relates to the use of a mixture of phthalates and trimellitates to plasticise PVC, to produce a composition useful for wire and cable coating and jacketing. Specifically, a plasticiser blend comprising 43 parts of di-tridecyl phthalate and 7 parts of tri-isononyl trimellitate is used per 100 parts of PVC. These blends are said to have improved high temperature performance. However, trimellitates are known to exhibit poorer cold flexibility properties than phthalates. Therefore, a blend with phthalates would fail to meet the cold strength test.

As the linearity of the alcohol used to make the phthalate ester increases, certain predictable events occur. One may expect reduced plasticiser volatility, improved plasticiser efficiency towards making PVC flexible, improved low temperature flexibility, and sometimes improved processability, the latter characteristic being often a combination of plasticiser solvency and plasticiser neat viscosity. Linearity is usually defined by either a branching index or by the number of branches per alkyl side chain as determined by proton NMR analyses. As the linearity of a plasticiser increases, its compatibility with PVC can decrease, where "compatibility" is used to reference a usable product with no or slight plasticiser exudation under stress. As linearity of a plasticizer increases its diffusion within the PVC is higher and its migration from PVC to another material in contact with PVC increases. For trimellitate esters, the most common alcohols used to prepare the ester are $C_8$ through $C_9$ primary alcohols. However, the use of more linear alcohols increases the cost of the plasticiser.

SUMMARY

The invention provides a plasticiser blend which is useful with resins, particularly flexible PVC resins, to provide formulations useful over an extended temperature range, allowing use in both high temperatures and low temperatures as are required in wire and cable insulation. The invention is particularly useful in providing formulations for the coating of wire and cable used in automobiles, trucks, busses, and railroad applications.

The invention therefore provides a blend of:
i) a dialkyl phthalate in which the alkyl groups contain from 10 to 14 carbon atoms and/or a trimellitate in which the alkyl groups contain from 8 to 10 carbon atoms, and
ii) a dialkyl adipate in which the alkyl groups contain from 11 to 14 carbon atoms.

We have found that the blend has acceptable high temperature volatility, and has improved low temperature properties when used to plasticise PVC.

The invention therefore further provides a composition comprising PVC and:
i) a dialkyl phthalate in which the alkyl groups contain from 10 to 14 carbon atoms and/or a trimellitate in which the alkyl groups contain from 8 to 10 carbon atoms, and
ii) a dialkyl adipate in which the alkyl groups contain from 11 to 14 carbon atoms.

We have found that wire and cable coated with such PVC compositions has improved low temperature flexibility as demonstrated by a rotatable mandrel and stationary mandrel test (ISO 6722.2006).

Accordingly, the invention further provides wire and cable coated with a composition comprising PVC and:
i) a dialkyl phthalate in which the alkyl groups contain from 10 to 14 carbon atoms and/or a trimellitate in which the alkyl groups contain from 8 to 10 carbon atoms, and
ii) a dialkyl adipate in which the alkyl groups contain from 11 to 14 carbon atoms.

The alkyl groups are derived from the alcohols that are used in esterification to produce the phthalate, trimellitate, and/or adipate. The alcohols may be single types of molecules, although they are usually mixtures of alcohols having an average number of carbon atoms in the specified range.

It has been found that the use of the mixture of the $C_{10}$ to $C_{14}$ phthalate and/or $C_8$ to $C_{10}$ trimellitate together with the $C_{11}$ to $C_{14}$ adipate as a plasticiser in wire and cable coating formulations gives desirable heat ageing performance as indicated by testing for 3000 hours at 105'C and accelerated heat ageing as tested at 130'C for 10 days and also meets the desirable cold winding performance. Furthermore, the use of the phthalate containing mixture provides processing benefits, in that the use of the adipate reduces the time required to blend a PVC formulation as compared with the use of the $C_{10}$ to $C_{14}$ phthalate alone as plasticiser. Preferred mixtures are mixtures of di-tridecyl phthalate (DTDP) and di-tridecyl adipate (DTDA) and mixtures of trioctyl trimellitate, trinonyl trimellitate, or tridecyl trimellitate with DTDA. The number of carbon atoms of the alkyl groups in the phthalate and the adipate may range from 10 to 14 with an average of about 13. A mixture of JayflexT™ DTDP (available from ExxonMobil Chemical) and Cereplas™ DTDA (available from Ineos) is particularly useful.

DETAILED DESCRIPTION

Polyvinyl chloride is available in many different forms—the variations being in the molecular weight of the polymer, the molecular weight distribution of the polymer, the particle size of the polymer particles, the particle size distribution, and the surface aspect of the particles which may be coarse or smooth. Another variable in polyvinyl chloride is the degree of chain branching. The vinyl chloride polymer may be a copolymer (e.g., a copolymer of vinyl chloride and vinyl acetate). Polymers of vinyl chloride may be obtained by suspension polymerisation or emulsion polymerisation. In suspension polymerisation, vinyl chloride monomer is suspended in water with agitation under carefully controlled temperature and pressure. The batch will also contain suspending agents and initiators. After polymerisation is complete, the batch is discharged to a stripper where unreacted monomer is removed. Finally, the suspension is washed and dried to obtain the suspension polyvinyl chloride.

Typical suspension polymerised polyvinyl chloride consists of agglomerated particles of size in the range 80 to 200 microns. Polyvinyl chloride produced by suspension polymerisation is typically used in dry blend applications.

Different forms of polyvinyl chloride are used in different applications. One important property is the mean molecular weight of the polymer. A factor known as the K value is used to indicate the mean molecular weight of polyvinyl chloride. The K value is the viscosity of a 0.005 wt % solution of the polyvinyl chloride in cyclohexanone at 25° C. as measured using an Ubbelhode viscometer. The K value is the German standard DIN 53726. The K value of the polyvinyl chloride impacts the fusion temperature and gellation rate of the plasticised polyvinyl chloride composition. The K value also influences the melt viscosity of the plasticised polyvinyl chloride composition and the rate at which the composition can be formed. Typically, the higher the K value the better the mechanical properties but the lower the flowability. Accordingly, the formulator of polyvinyl chloride will select the nature of the polyvinyl chloride and the nature of the plasticiser to optimise the properties for a particular use.

Where the plasticised polyvinyl chloride is to be used in wire and cable applications with which the present invention is particularly concerned, it is preferred to use a suspension polymerised polyvinyl chloride having a K value above 70.

The polyvinyl chloride and the plasticiser may be mixed by the conventional formulating techniques currently used in the production of plasticised polyvinyl chloride formulations. The formulator will attempt to provide a versatile composition having a good balance of properties at reasonable cost.

The formulator will be concerned to optimise the balance between end-product properties such as flexibility, low temperature performance, flame resistance, high temperature resistance, volatility, electrical properties, and processability a time required for dry blending. Typically 20 to 100 parts, preferably 30 to 50 parts, of the plasticiser formulation should be used per 100 parts of polyvinyl chloride.

The formulations containing the polyvinyl chloride and the plasticiser may contain other additives. The majority of formulations will contain a stabiliser which counters the effects of ageing; heat stabilisers also reduce the dehydrodehalogenation of the polyvinyl chloride at the temperatures at which the formulation is processed. Stabilisers, such as benzotriazole and benzophenone, also reduce the degradation by sunlight, ozone, and biological agents. Typically, the formulations contain from 0.5 to 15 parts total stabilisers, normally from 1.5 to 7 parts, typically 1.5 to 5 parts by weight of stabiliser per 100 parts of the polyvinyl chloride.

Stabilisers to provide stability during heat processing are typically metal compounds; particularly zinc salts or calcium/zinc stabilisers or aluminium/magnesium/zinc stabilisers, which are used in wire and cable applications. Organic phosphates and polyols may also be used. Calcium/zinc stabiliser systems are also used in wire and cable, foil and sheeting, wall coverings, medical applications, tubes and footwear, food packaging film, and fabric coating.

Other ingredients which may be added to the polyvinyl chloride formulations include fillers such as calcium carbonate. When used, the filler may be present in an amount up to 100 parts per 100 parts of polyvinyl chloride. Lubricants, pigments, and processing acids may be included. Other ingredients will be chosen according to the use to which the formulation is to be put. For example, the formulation may contain antioxidants, such as bisphenol A or Topanol CA™.

Fillers are incorporated in the formulations to reduce cost, increase the output of dry blending, increase electrical resistance, increase resistance to ultraviolet light, increase hardness, produce improved heat transmission, increase the resistance to heat deformation, and improve abrasion resistance. Fillers can also impart anti-blocking or anti-slip performance. Examples of suitable fillers include calcium carbonate, clays such as alumino-silicates, silica, dolomite, and bauxite.

The particular particle size distribution and average surface area of the filler will be chosen according to the properties it is desired to impart.

Lubricants and processing aids may be included to reduce the adhesion between polyvinyl chloride and hot machinery surfaces during processing. The lubricants also affect the frictional properties between resin particles during processing. Examples of lubricants include stearic acid and metal stearates which can also act as stabilisers. Other lubricants that may be used include petroleum waxes, silicon oil, mineral oil, synthetic esters, and polyethylene waxes.

The formulations may also contain flame retardants to increase ignition time, reduce flame spreading and rate of burning. The flame retardants should have a high decomposition temperature, low volatility, a minimum effect on thermal and mechanical properties, and good resistance to light and ultra violet radiation. Examples of flame retardants that may be used include halogen containing compounds and phosphorous containing organic compounds such as triaryl, trialkyl, or alkyl diaryl phosphate esters. Other materials that may be used include chloroparaffins, aluminum trihydrate $Al(OH)_3$ or antimony oxides $Sb_2O_3$.

Although the PVC formulations of the invention can have many uses the invention is particularly concerned with PVC formulations useful for wire and cable coating and accordingly in a preferred embodiment the invention provides a wire and cable coating formulation comprising:
  (i) 100 parts PVC;
  (ii) 20 to 60 parts, preferably 40 to 60, more preferably 35 to 50 parts of a plasticiser blend of the present invention;
  (iii) a filler; and
  (iv) a stabiliser.

For optimum heat ageing and low temperature properties as required for wire and cable coating, the preferred ratio of $C_{10}$ to $C_{14}$ phthalates or $C_8$ to $C_{10}$ trimellitate to $C_{11}$ to $C_{14}$ adipate is preferably in the ratio 2/3 (phthalates or trimellitates) to (1/3 adipates), such as from 25 to 45 parts DTDP and from 8 to 15 parts DTDA per 100 parts of PVC.

In the preferred formulation the filler is present at from 1 to 30 parts, preferably 15 to 30 parts, by weight per 100 parts of the PVC. Additionally, it is preferred that the stabiliser is present at from 5 to 15 parts, preferably from 8 to 15 parts by weight per 100 parts of the PVC.

In other preferred embodiments, the PVC is suspension PVC, the filler is calcium carbonate and the stabiliser is a calcium/zinc stabiliser.

Preferred formulations also contain an antioxidant such as Topanol™ CA to improve heat ageing; suitably from 0.1 to 1 wt %, preferably from 0.2 to 0.5 wt % antioxidant can be used.

Preferred formulations can also contain a wax or lubricant typically included with the PVC stabiliser as a "one pack" system. Preferred formulations can also include a pigment.

Although they are particularly useful in the provision of flexible PVC insulation for automobile wire and cable coating, the plasticizers of the present invention may also be used for building wire insulation for products with 90° C. or 105° C. requirements such as those required to pass the UL83 requirements with THHN, THWN, THWN-2, THW, and THW-2 ratings, in lead and non-lead stabilised formulations.

In order to pass the difficult internal electrical resistance (IR) 26 week aging tests at 70° C. and 90° C. requirements of THHN and THWN PVC insulation, the trend is to use less plasticizer, and lower filler levels, with perhaps incorporation of a wax lubricant. The IR test is a measure of the ability of the wire insulation to maintain its electrical resistance as measured to a defined direct current voltage. In this test, the wire is placed in a water bath at either 70° C. or 90° C. for up to 26 weeks and the electrical resistance of the insulation measured in regular intervals. When the electrical current leakage through the insulation increases to defined levels, the product fails. For a product to pass this test, the insulation must exhibit a minimal amount of current leakage during the entire 26 week interval.

As the plasticizer concentration is decreased, the ability to pass the long term IR test improves but the wire becomes too stiff to be useful, especially in other tests such as the UL719 section 23 joist pull test and low temperature flexibility. Higher plasticizer concentrations improve the flexibility and the retained physical properties after aging at 136° C., but failures occur in the IR test. Higher plasticizer levels also create more problems in meeting flammability requirements. Thus, there is a need for a plasticizer system that can improve the performance of the long term IR test, while achieving lower temperature flexibility, and maintaining acceptable performance in the 136° C. for 7 days ageing test. It is generally desirable in these insulation formulations, to use lower plasticizer concentrations, for the raw material costs of the formulation increases with increasing concentrations of the plasticizers since higher molecular weight plasticizers are more expensive than PVC resin when compared on both weight costs and volume costs.

We have found that the plasticizer formulations of this invention containing ditridecyl adipate achieve this, providing a PVC UL83 building wire formulation with improved performance in the 26 week IR test while meeting low temperature flexibility tests and retained properties after ageing.

A typical formulation which has been found to meet these objectives is:

| | | |
|---|---|---|
| PVC, K 70 | 100 | parts |
| Jayflex ™ TINTM | 33 | |
| DTDA | 10 | |
| Sb$_2$O$_3$ | 3 | |
| Clay filler, Burgess ™ KE | 10 | |
| Stabilizer Naftosafe ™ PKP 314 | 4 | (non-lead) from Chemson | and passes the UL83 at 136° C. ageing tests, and will pass the 26 week IR tests. The use of DTDA in this plasticizer blend with TINTM allows several specific advantages over formulations without DTDA. Less plasticizer is needed to give the wire meeting the flexibility and low temperature requirements; less plasticizer means lower formulation costs, improved flame retardancy, and better performance in the 26 week IR test.

Here in this example, TINTM is tri-isononyl trimellitate prepared by the esterification of trimellitic anhydride with isononyl alcohol.

TW and TWH 60° C. and 75° C. building wire insulation products do not have to meet the same requirements of the 90° C. THWN and THHN building wire insulations. Although, the oven aging conditions are not as severe as for the higher temperature rated wires, these building wires are expected to provide acceptable retained tensile properties after aging at 121° C. Higher filler levels can be used in these formulations because there is not a long term IR requirement, but at higher filler levels, the wire can become too stiff. Thus, in this application a plasticizer system that can enable the use of higher filler levels and still pass all of the physical property requirements while providing good low temperature flexibility is required. C$_8$ to C$_{10}$ adipates and other diester plasticizers cannot be used in these formulations because they will fail the 121° C. ageing test.

The composition of this invention can provide these properties and a typical formulation comprises:

| | |
|---|---|
| PVC OxyVinyls ™ 240 | 100 |
| JAYFLEX ™ DIDP-E | 30 |
| DTDA | 20 |
| Calcined Clay | 16 |
| Calcium Carbonate | 15 |
| Naftosafe PKP-314 | 2.5 |

Jayflex™ DIDP-E is electrical grade di-isodecyl phthalate with added antioxidant such as Topanol CA or BPA. The use of DTDA in this formulation gives an improved flexibility and better retained properties after ageing that cannot be achieved with the use of C$_8$ to C$_{10}$ adipates, and gives a reduction in total plasticizer content which translates to formulation cost savings.

In UL 83 NM-B (non metallic sheathed 600 volt cables, not to exceed 90° C.) electrical building wire jacketing products, there is a desire to provide a product with reduced surface tension or some level of surface lubricating. If a wire product has a high coefficient of friction it can be difficult to fit and pull through internal sections of walls and ceilings. One commonly used approach is to use as a plasticizer system, a blend of a primary plasticizer such as DIDP with a secondary plasticizer, typically a naphthenic base mineral oil such as Jayflex™ 210 commercially available from ExxonMobil Chemical. Because of volatility requirements, the composition of Jayflex 210 in the plasticizer system is generally limited to 10%.

Another technique is to incorporate a migratory lubricating agent such as a higher weight amide as described in Japanese Patent Application Publication No. 61-133509 where erucamide is added to the jacketing formula to reduce surface tension. This technology is expanded a little further where US Patent Application Publication No. 2006/0151193 describes the use of various polyamides and other amides as well as mineral and process oil for this same application. These lubricants can either be applied during the formulation step or sprayed on the surface as the wire is being produced.

The importance of these technologies in reducing surface tension of the jacketing of the NM-B wire can be demonstrated in the UL joist pull test, UL719 Section 23, where the use of these additives is known to reduce the force required to pull the wire through holes drilled in joists.

However, these technologies have disadvantages. The amount of the mineral oil Jayflex™ 210 that can be used is limited because of volatility. Use of added slip agents such as erucamide has the disadvantage that they will continue to migrate out of the system. Spraying with polyamides and other polymers is expensive.

There is, therefore, a need for a plasticizer system that has low migration and greater permanence, which leads to surface tension reduction and lower formulation costs. We have found that the plasticiser systems of the present invention enable the production of a flexible PVC formulation that gives reduced surface tension, improves or reduces the volatile losses during processing, and does not suffer from continued migration or exudation. An example of such a formulation is:

| | |
|---|---|
| PVC OxyVinyls 240 | 100 |
| JAYFLEX ™ DIDP | 58 |
| DTDA | 4 |
| Calcium Carbonate | 45 |
| Baerostab ™ V220 MC(CaZn stabilizer) | |
| Stearic Acid | 0.25 |

In this example, the use of DTDA achieves the same level of surface tension reduction or slip as that obtained with Jayflex™ 210 and the use of DTDA does not contribute to volatile losses in processing.

If further surface tension reduction is needed, the level of DTDA can be increased, and, along with that, the total level of all plasticizers can be decreased such as in the following formulation:

| | |
|---|---|
| PVC OxyVinyls 240 | 100 |
| JAYFLEX ™ DIDP | 40 |
| DTDA | 15 |
| Calcium Carbonate | 45 |
| Baerostab V220 MC | 4 |
| Stearic Acid | 0.25 |

This formulation gives the advantage of reducing the total plasticizer level, which improves flammability, and reduces surface tension with non-migrating chemicals.

EXAMPLES

It is to be understood, that while the invention has been described in conjunction with the specific embodiments thereof, the foregoing description is intended to illustrate and not limit the scope of the invention. Other aspects, advantages, and modifications will be apparent to those skilled in the art to which the invention pertains.

Therefore, the following examples are put forth so as to provide those skilled in the art with a complete disclosure and description and are not intended to limit the scope of that which the inventors regard as their invention.

The following tests were used:
Mandrel Test
ISO 6722:2006—paragraph 8—stationary mandrel The test involves the testing of cable samples (600 mm length) from which 25 mm of insulation is removed from each end. Cables are placed in a freezing chamber at (−40±2)° C. [(−25±2)° C.] using either a rotatable or a stationary mandrel. The test sample is wound for at least the "minimum number of turns" around the mandrel within the freezing chamber and at winding speed as specified in the ISO 6722. After the cold winding, the test samples are allowed to return to room temperature, a visual examination of the insulation is made and if no exposed conductor is visible, the withstand voltage test is performed.

Low Temperature Flexibility
Clash & Berg Measurement—
ASTM D 1043-84 Stiffness properties of plastics as a function of temperature by means of a torsion test.

Brittleness Test:
Determination of the cold brittleness temperature of flexible PVC compounds by impact using a Frank Pendulum Impact tester—ASTM D746 Test method for brittleness temperature of plastics and elastomers by impact.

Folding Test:
Determination of suppression at groove in coolness—mainly used to test finished coated fabrics—DIN 53361.

Two solid metal plates connected with a hinge like joint. The upper plate can be lifted to a maximum of ±90°. When dosed, the gap between the plates can be easily adapted with the 3 screws. DIN 53361: Testing of artificial leather and similar sheet materials; determination of suppression at groove in coolness. Test apparatus for the folding test (Test A):

Tensile, Elongation at Break:
ASTM D 638: Standard Test Method for Tensile Properties of Plastics Dumbells were pressed from the formulation and tested for tensile strength and elongation to break on Universal testing machine from Zwick T1-FR005TN.A50.

Plastids Effect—Efficiency Factor—Hardness
ASTM D 2240-2002: Standard test method for rubber—Durometer Hardness.

Examples 1-4

TABLE 1

| Formulation | Example 1 (comparative) | Example 2 | Example 3 | Example 4 |
|---|---|---|---|---|
| Suspension PVC (available from Perplastic) | 100 | 100 | 100 | 100 |
| Jayflex ™ DTDP (stabilized with 0.3 wt % Topanol ™ CA) | 46 | 30 | 30 | 35 |
| Cereplas ™ DTDA (available from Ineos) | — | 15 | 15 | 10 |
| Calcium Carbonate EXH 1SP (available from Omya) | 20 | 20 | 10 | 10 |
| Ca/Zn Stabiliser Baeropan ™ MC8656 KA-ST (available from Baerlocher GmbH) | 10 | 10 | 10 | 10 |

The formulations were subject to the following tests and were found to have the properties set out in Table 2.

TABLE 2

| Formulation | Example 1 (Comparative) | Example 2 | Example 3 | Example 4 |
|---|---|---|---|---|
| Hardness Shore D | 44.5 | 44.2 | 43.5 | 43.4 |
| Elongation at Break % | 292 | 310 | 298 | 315 |
| Tensile Strength N/mm² | 23 | 23 | 23 | 25 |
| Clash & Berg T° | −15 | −18 | −19 | −17 |
| Brittleness T° | −37 | −30 | −39 | −32 |
| Folding Test at −35° C.* | Cracking | Good | Good | Good |

*All samples had poor folding performance at −40° C.

Example 5

FLRY-A—PVC automotive cable with thin wall insulation—cross section 0.35 mm² and FLRY-B—PVC automotive cable with thin wall insulation—cross section 0.50 mm² were produced from the following formulation:

| | |
|---|---|
| PVC (K71) | 100 parts |
| Jayflex ™ DTDP | 30 parts |
| Cereplas ™ DTDA | 16 parts |
| Filler (CaCO₃) | 25 parts |
| Stabiliser (Ca/Zn) | 8 parts |

The cables were subjected to the mandrel test (LV 112-8.6.8):
FLRY-A—Mandrell diameter 6.5 mm/Weight 0.5 kg
FLRY-B—Mandreli diameter 8.0 mm/Weight 0.5 kg
and it was reported that the two cables were found to pass.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A wire and cable coating formulation comprising:
(i) 100 parts PVC;
(ii) 25 to 45 parts DTDP and from 8 to 15 parts DTDA;
(iii) a filler; and
(iv) a stabiliser.

* * * * *